United States Patent
Krishnappa

(10) Patent No.: US 9,246,933 B1
(45) Date of Patent: Jan. 26, 2016

(54) SYSTEMS AND METHODS FOR DETECTING MALICIOUS EMAIL ATTACHMENTS

(75) Inventor: Bhaskar Krishnappa, Bristol (GB)

(73) Assignee: Symantec Corporation, Mountain View, CA (US)

( * ) Notice: Subject to any disclaimer, the term of this patent is extended or adjusted under 35 U.S.C. 154(b) by 347 days.

(21) Appl. No.: 13/557,679

(22) Filed: Jul. 25, 2012

(51) Int. Cl.
*H04L 29/06* (2006.01)
*G06F 21/56* (2013.01)

(52) U.S. Cl.
CPC ............ *H04L 63/1433* (2013.01); *G06F 21/56* (2013.01)

(58) Field of Classification Search
USPC ...................................... 726/22, 24
See application file for complete search history.

(56) References Cited

U.S. PATENT DOCUMENTS

| | | | |
|---|---|---|---|
| 7,519,990 B1 * | 4/2009 | Xie | 726/13 |
| 8,752,172 B1 * | 6/2014 | Dotan et al. | 726/22 |
| 2003/0079142 A1 * | 4/2003 | Margalit et al. | 713/200 |
| 2009/0089859 A1 * | 4/2009 | Cook et al. | 726/3 |
| 2011/0093952 A1 * | 4/2011 | Kumar et al. | 726/24 |

* cited by examiner

*Primary Examiner* — Joseph P Hirl
*Assistant Examiner* — Chi Nguy
(74) *Attorney, Agent, or Firm* — ALG Intellectual Property, LLC

(57) ABSTRACT

A computer-implemented method for detecting malicious email attachments may include (1) identifying a shortcut file received as an attachment to an email, wherein the shortcut file is configured to open a target file, (2) analyzing the shortcut file to identify at least one attribute of the shortcut file, wherein the attribute comprises information about the shortcut file useful for determining whether text accurately characterizes the shortcut file, (3) identifying accompanying text in the email that characterizes the attachment, and (4) determining that the attachment is malicious by comparing the attribute of the shortcut file with the accompanying text in the email that characterizes the attachment and, based on the comparison, determining that the accompanying text does not accurately characterize the shortcut file. Various other methods, systems, and computer-readable media are also disclosed.

20 Claims, 7 Drawing Sheets

SYSTEMS AND METHODS FOR DETECTING MALICIOUS EMAIL ATTACHMENTS

BACKGROUND

Emails may include a variety of different attachments, such as pictures, documents, and/or videos, among others. While attachments received from close friends or family members are commonly safe and free of malware, attachments received from unfamiliar sources may pose a security risk. In particular, attackers may send malicious attachments through email in mass mailings or targeted attacks. These malicious attachments may appear as legitimate files, such as documents, statements, receipts, etc., but may actually reference separate files that are malicious. Although some email recipients may be keen enough to recognize attachments with questionable and/or unfamiliar characteristics, attackers are becoming more skilled at disguising the attachments to make them appear legitimate. For example, an attacker may associate a misleading computer icon with the attachment in order to mask a malicious action that occurs when the attachment is opened. Thus, even computer-savvy email recipients may be duped by attachments that seem legitimate, but actually reference separate files that are malicious. Accordingly, the instant disclosure identifies a need for additional and improved systems and methods for detecting malicious email attachments.

SUMMARY

As will be described in greater detail below, the instant disclosure generally relates to systems and methods for detecting malicious email attachments by determining that an email and/or a shortcut file attached to the mail mischaracterizes the nature of the shortcut file. In one example, a computer-implemented method for detecting malicious email attachments may include (1) identifying a shortcut file (that is configured to open a target file) received as an attachment to an email, (2) analyzing the shortcut file to identify at least one attribute of the shortcut file that includes information about the shortcut file useful for determining whether text accurately characterizes the shortcut file, (3) identifying accompanying text in the email that characterizes the attachment, and (4) determining that the attachment is malicious by comparing the attribute of the shortcut file with the accompanying text in the email that characterizes the attachment and, based on the comparison, determining that the accompanying text does not accurately characterize the shortcut file.

The attribute of the shortcut file may include any of a variety of information. For example, the attribute of the shortcut file may include (1) information identifying the target file, (2) information identifying a file extension of the shortcut file, (3) information identifying a computer icon associated with the shortcut file, (4) information identifying at least one command line argument applying to the target file, and/or (5) information identifying a location of the target file.

In some embodiments, determining that the attachment is malicious may further include (1) identifying a file type represented by the computer icon associated with the shortcut file, and (2) comparing the file type represented by the computer icon with the file type of the target file, and, based on the comparison, determining that the file type represented by the computer icon does not match the file type of the target file. Additionally or alternatively, determining that the attachment is malicious may include (1) determining that the location identified by the attribute corresponds to a removable storage device, and/or (2) determining that the location identified by the attribute corresponds to a remote network location.

In some examples, the computer-implemented method may also include determining whether the command line argument applying to the target file is malicious. The command line argument may include (1) a malicious instruction, (2) malicious content, (3) a malicious application, and/or (4) a malicious payload. In some embodiments, identifying accompanying text in the email that characterizes the attachment may include parsing the accompanying text in the email to identify at least one key word within the email that characterizes the attachment. In some examples, the computer-implemented method may also include performing a security action responsive to determining that the attachment is malicious. The security action may include (1) displaying a warning message indicating that the attachment is malicious, (2) describing an anticipated effect of opening the attachment, (3) blocking an attempt to open the attachment, (4) quarantining the attachment, and/or (5) removing the attachment.

In one embodiment, identifying accompanying text in the email that characterizes the attachment may include identifying accompanying text that characterizes the attachment as not being a shortcut file. In the same embodiment, determining that the attachment is malicious may include determining that the attachment includes a shortcut file. In some examples, the accompanying text that characterizes the attachment characterizes a file type of the attachment.

In one embodiment, a system for implementing the above-described method may include (1) a shortcut-identification module programmed to identify a shortcut file (that is configured to open a target file) received as an attachment to an email, (2) an attribute-identification module programmed to analyze the shortcut file to identify at least one attribute of the shortcut file that includes information about the shortcut file useful for determining whether text accurately characterizes the shortcut file, (3) a text-identification module programmed to identify accompanying text in the email that characterizes the attachment, and (4) a malicious-attachment-determination module programmed to determine that the attachment is malicious by comparing the attribute of the shortcut file with the accompanying text in the email that characterizes the attachment and, based on the comparison, determining that the accompanying text does not accurately characterize the shortcut file. In some examples, the system may also include at least one processor configured to execute the shortcut-identification module, the attribute-identification module, the text-identification module, and the malicious-attachment-determination module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a shortcut file (that is configured to open a target file) received as an attachment to an email, (2) analyze the shortcut file to identify at least one attribute of the shortcut file that includes information about the shortcut file useful for determining whether text accurately characterizes the shortcut file, (3) identify accompanying text in the email that characterizes the attachment, and (4) determine that the attachment is malicious by comparing the attribute of the shortcut file with the accompanying text in the email that characterizes the attachment and, based on the comparison, determine that the accompanying text does not accurately characterize the shortcut file.

As will be explained in greater detail below, by analyzing accompanying text in emails that characterizes shortcut file attachments, the systems and methods described herein may more effectively determine whether shortcut file attachments are malicious. For example, these systems and methods may determine that the text in an email mischaracterizes the nature of the shortcut file attachment and/or a file referenced by the shortcut file attachment, thereby determining that the attachment is untrustworthy. Furthermore, by analyzing the attributes of shortcut files, these systems and methods may determine whether opening the shortcut file results in opening an anticipated type of file. By identifying accompanying text in the email that characterizes the attachment, as well as identifying attributes of the shortcut file, the systems and methods described herein may utilize additional information useful for determining whether shortcut file attachments are trustworthy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
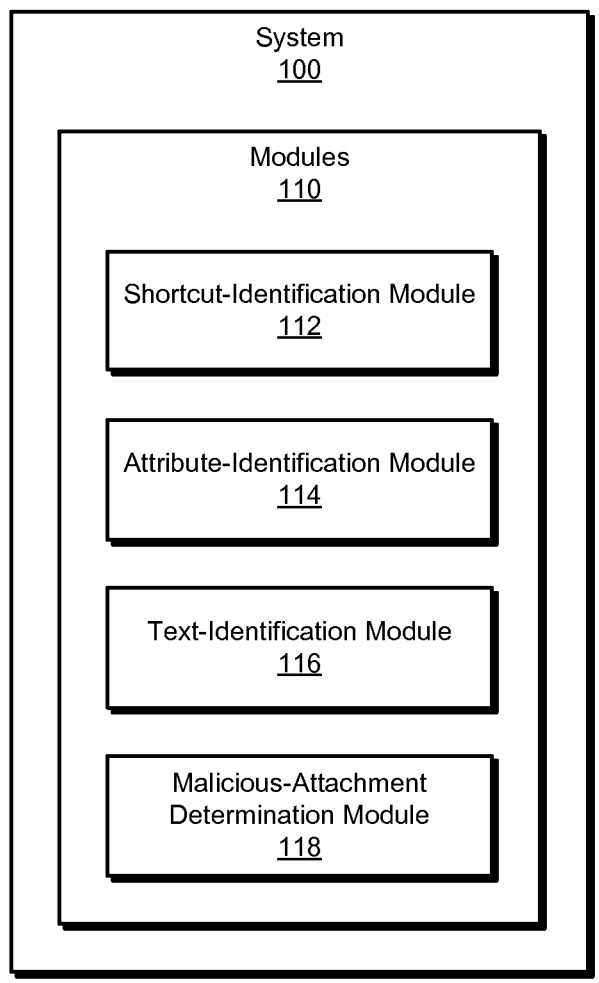
FIG. 1 is a block diagram of an exemplary system for detecting malicious email attachments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
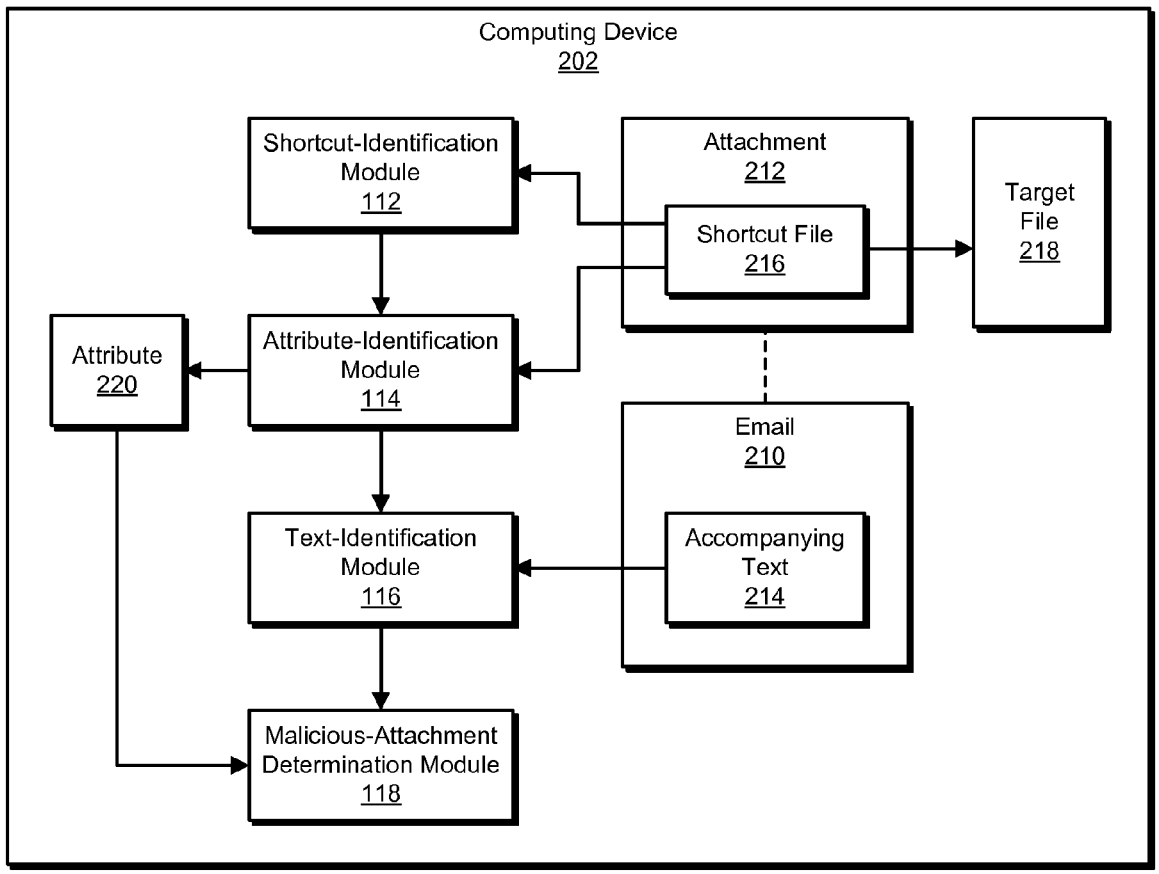
FIG. 2 is a block diagram of an exemplary system for detecting malicious email attachments.
Figure 4:
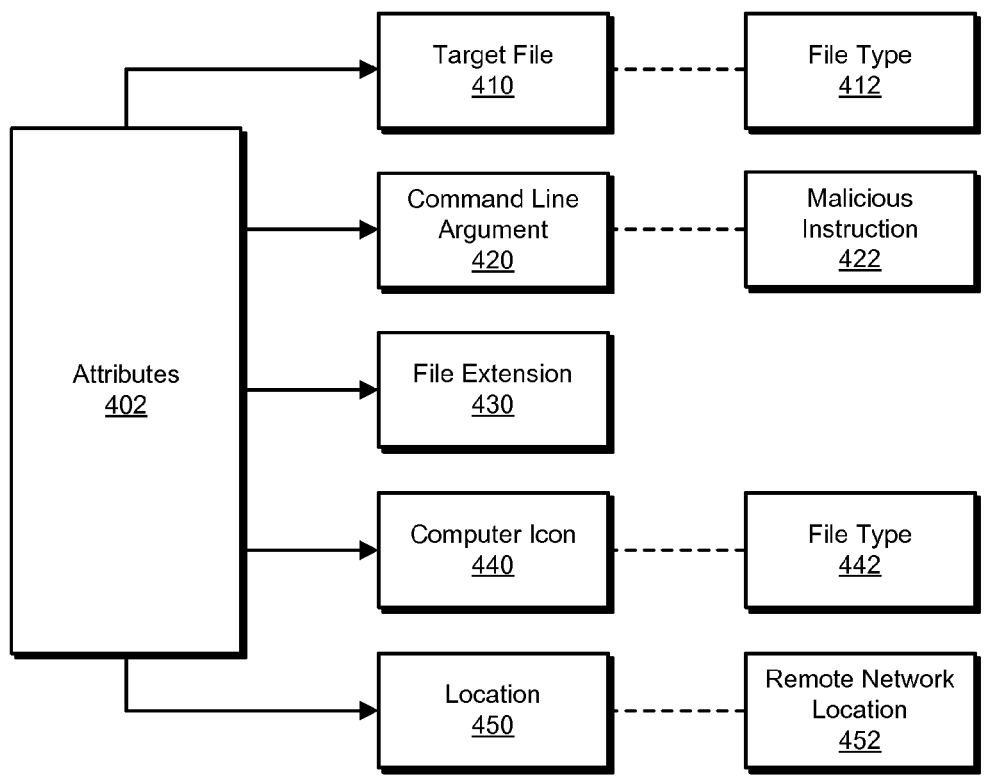
FIG. 4 is a block diagram of exemplary data for detecting malicious email attachments.
Figure 5:
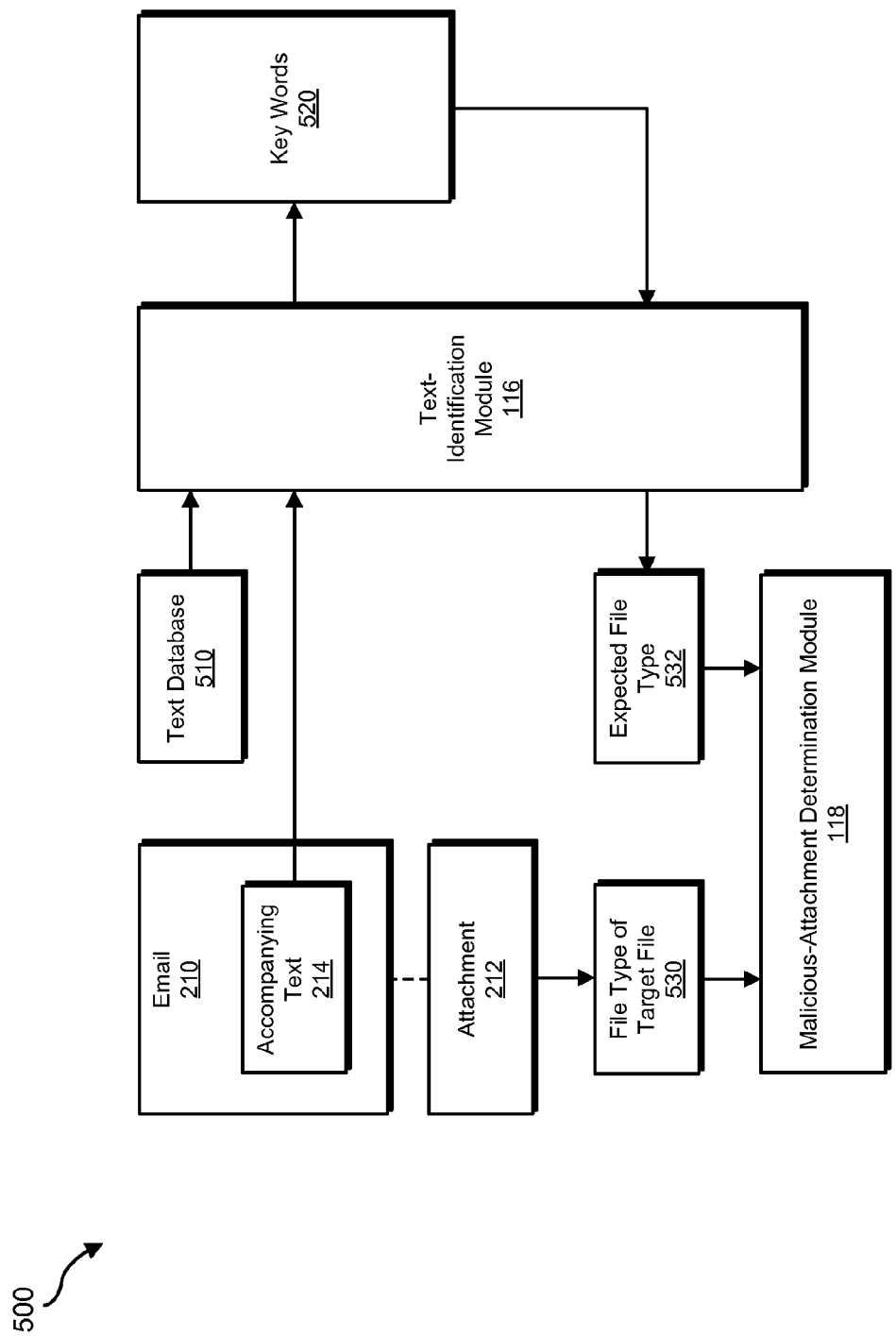
FIG. 5 is a block diagram of an exemplary system for detecting malicious email attachments.

The following will provide, with reference to FIGS. 1, 2, and 5 detailed descriptions of exemplary systems for detecting malicious email attachments. Detailed descriptions of corresponding computer-implemented methods will also be provided in connection with FIG. 3. Detailed descriptions of exemplary data for detecting malicious email attachments will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting malicious email attachments. As illustrated in this figure, exemplary system 100 may include one or more modules 110 for performing one or more tasks. For example, and as will be explained in greater detail below, exemplary system 100 may include a shortcut-identification module 112 programmed to identify a shortcut file received as an attachment to an email, wherein the shortcut file is configured to open a target file. Exemplary system 100 may also include an attribute-identification module 114 programmed to analyze the shortcut file to identify at least one attribute of the shortcut file, wherein the attribute includes information about the shortcut file useful to determine whether text accurately characterizes the shortcut file. Exemplary system 100 may also include a text-identification module 116 programmed to identify accompanying text in the email that characterizes the attachment.

In addition, and as will be described in greater detail below, exemplary system 100 may include a malicious-attachment-determination module 118 programmed to determine that the attachment is malicious by comparing the attribute of the shortcut file with the accompanying text in the email that characterizes the attachment and, based on the comparison, determine that the accompanying text does not accurately characterize the shortcut file. Although illustrated as separate elements, one or more of modules 110 in FIG. 1 may represent portions of a single module or application.

In certain embodiments, one or more of modules 110 in FIG. 1 may represent one or more software applications or programs that, when executed by a computing device, may cause the computing device to perform one or more tasks. For example, and as will be described in greater detail below, one or more of modules 110 may represent software modules stored and configured to run on one or more computing devices, such as computing device 202 illustrated in FIG. 2, computing system 610 in FIG. 6, and/or portions of exemplary network architecture 700 in FIG. 7. One or more of modules 110 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 (e.g., having received an email 210 subject to a security scan).

In one embodiment, one or more of modules 110 from FIG. 1 may, when executed by at least one processor of computing device 202, facilitate computing device 202 in detecting malicious email attachments. For example, and as will be described in greater detail below, one or more of modules 110 may cause computing device 202 to (1) identify a shortcut file (e.g., a shortcut file 216) received as an attachment (e.g., an attachment 212) to an email (e.g., email 210), wherein the shortcut file is configured to open a target file (e.g., a target file 218), (2) analyze the shortcut file to identify at least one attribute of the shortcut file (e.g., analyze shortcut file 216 to identify attribute 220 of shortcut file 216), wherein the attribute includes information about the shortcut file useful for determining whether text accurately characterizes the shortcut file, (3) identify accompanying text (e.g., accompanying text 214) in the email that characterizes the attachment, and (4) determine that the attachment is malicious by comparing the attribute of the shortcut file with the accompanying text in the email that characterizes the attachment and, based on the comparison, determine that the accompanying text does not accurately characterize the shortcut file (e.g., determine that attachment 212 is malicious by comparing attribute 220 of shortcut file 216 with accompanying text 214 in email 210 that characterizes attachment 212 and, based on the comparison, determine that accompanying text 214 does not accurately characterize shortcut file 216).

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 610 in FIG. 6, or any other suitable computing device.

Figure 3:
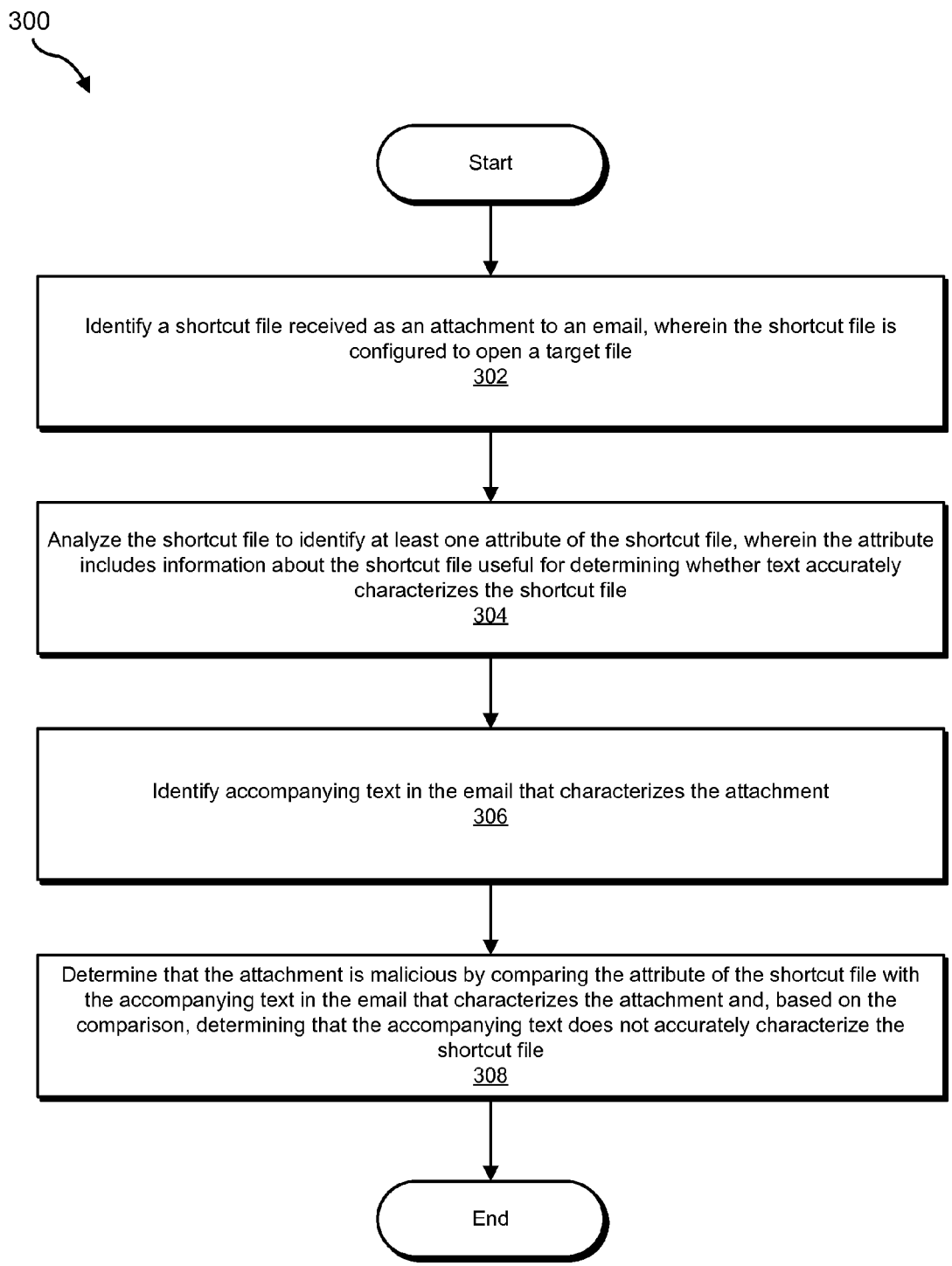
FIG. 3 is a flow diagram of an exemplary method for detecting malicious email attachments.

FIG. 3 is a flow diagram of an exemplary computer-implemented method 300 for detecting malicious email attachments. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a shortcut file received as an attachment to an email, wherein the shortcut file is configured to open a target file. For example, at step 302 shortcut-identification module 112 may, as part of computing device 202 in FIG. 2, identify shortcut file 216 received as attachment 212 to email 210, wherein shortcut file 216 is configured to open target file 218.

As used herein, the phrase "shortcut file" may refer to any file that references a target file that is opened, launched, and/or executed when the shortcut file is selected and/or opened within a computing environment. In some examples, the shortcut file may point to a specific folder, file, and/or computer program. In some embodiments, such as in the MICROSOFT WINDOWS operating system, the shortcut file may include a LNK file (e.g., for referencing locally-stored files), and/or a URL file (e.g., for remotely-stored files, such as web pages). As used herein, the phrases "shortcut file" and "link file" are used interchangeably to generally refer to any file that references a target file. The shortcut file may have a computer icon that indicates the file type and/or computer application associated with the shortcut file. In general, selecting the shortcut file may produce the same result as selecting the file or computer application referenced by the shortcut file. For example, selecting a shortcut file that has a computer icon indicating that the shortcut file is an executable file may cause the computer application associated with the executable file to open. In some examples, a shortcut file may specify one or more parameters to apply to the target file when the shortcut file is launched.

As used herein, the phrase "target file" may refer to any file that is referenced by a shortcut file. In some embodiments, the target file may include a locally-stored file and/or a remotely-stored file. For example, the target file may include a web page and/or a file at a remote location. The target file may include, but is not limited to, an executable file, an image file, an audio file, a video file, and/or a document file. When the shortcut file is selected and/or opened within an operating environment, the target file may execute and/or open (e.g., within an application associated with a file type of the target file), depending on the file type of the target file.

As mentioned earlier, shortcut-identification module 112 may identify the shortcut file received as an attachment to email. Shortcut-identification module 112 may identify the shortcut file as a shortcut file in any suitable manner. In some examples, the email may include one or more attachments of varying file types. For example, the email may include the shortcut file with a MICROSOFT WORD icon, as well as an image file that is not a shortcut file. Shortcut-identification module 112 may analyze all attachments in the email, and select the shortcut files from the attachments. For example, shortcut-identification module 112 may identify the file extension of each attachment included in the email, and, based on determining the file extension of an attachment corresponds to a shortcut file extension (e.g., a LNK file), shortcut-identification module 112 may identify the attachment as a shortcut file. Additionally or alternatively, shortcut-identification module 112 may parse the contents of the shortcut file to identify a file structure and/or metadata identifying the attachment as a shortcut file.

In some embodiments, the computing device may include an anti-malware policy that configures the computing device to scan incoming email attachments for malware. For example, based on the anti-malware policy, shortcut-identification module 112 may scan all attachments to detect the presence of malware. In some examples, shortcut-identification module 112 may scan an incoming attachment when the attachment arrives in the inbox, and an attachment that is free of malware may automatically open when the user attempts to open the attachment. In some examples, shortcut-identification module 112 may scan an attachment to detect malware after a user attempts to open the attachment.

Returning to FIG. 3, at step 304 one or more of the systems described herein may analyze the shortcut file to identify at least one attribute of the shortcut file, wherein the attribute includes information about the shortcut file useful for determining whether text accurately characterizes the shortcut file. For example, at step 304 attribute-identification module 114 may, as part of computing device 202 in FIG. 2, analyze shortcut file 216 to identify attribute 220 of shortcut file 216, wherein attribute 220 includes information about shortcut file 216 useful for determining whether accompanying text 214 accurately characterizes shortcut file 216.

The attributes of the shortcut file may include any of a number of characteristics of the shortcut file that are useful for determining whether the attachment is malicious. For example, the attributes of the shortcut file may include, but are not limited to, the name of the shortcut file, the file size of the shortcut file, the location of the shortcut file, the file type of the shortcut file (e.g., a LNK file), a computer icon associated with the shortcut file, and/or the date the shortcut file was created. Additionally or alternatively, the attributes of the shortcut file may include any of a number of characteristics of the target file that is referenced by the shortcut file. For example, the attributes of the target file may include, but are not limited to, the name of the target file, the file type of the target file, the location of the target file, at least one command line argument applying to the target file, and/or a computer icon associated with the target file. As will be discussed in more detail below, determining the attributes of the shortcut file may be useful for determining whether the text of the email accurately characterizes the shortcut file.

In some examples, attribute-identification module 114 may analyze the file structure of the shortcut file, and, based on the file structure, identify attributes of the shortcut file. For example, the file structure may include a number of different sections (e.g., file headers), potentially describing relevant characteristics of the shortcut file. Attribute-identification module 114 may parse one or more of these sections of the shortcut file and identify the relevant attributes of the shortcut file (e.g., the name of the target file, the location of the target file, etc.). For example, the shortcut file may include a LNK file. The file structure of the LNK file may include a number of different sections, such as LINKTARGET_IDLIST, LINKINFO, and/or STRING_DATA. In some examples, LINKTARGET_IDLIST may specify the target file referred to by the LNK file. LINKINFO may include information useful for identifying the location of the target file. In some embodiments, attribute-identification module 114 may parse the file structure of the shortcut file to identify attributes of the shortcut file useful for determining whether the attachment is malicious.

Attribute-identification module 114 may analyze the shortcut file to identify attributes of the shortcut file in any suitable manner. For example, attribute-identification module 114 may parse the shortcut file to identify the attribute that identifies the target file. In some examples, the shortcut file may include a LNK file and attribute-identification module 114 may identify the target file from the LINKTARGET_IDLIST section of the LNK file. In some examples, the information may include the file type and/or the file extension of the target file. The information may include the file name of the target file, the file size of the target file, as well as any other identifying characteristics of the target file.

In some examples, attribute-identification module 114 may analyze the shortcut file to identify attributes that include information identifying at least one parameter applying to the target file. For example, attribute-identification module 114 may identify a command line argument applying to the target file. In particular, attribute-identification module 114 may parse the shortcut file to identify the command line argument. In some examples, the shortcut file may include a LNK file and attribute-identification module 114 may identify the command line argument from the STRING_DATA section of the LNK file. As used herein, the phrase "command line argument" may refer to any argument and/or parameter applying to a file and/or an application configured to open a file.

The command line argument may include additional arguments applied to the target file, thereby affecting the computer application that opens and/or executes the target file. In some examples, the command line argument may be sent to the computer application launching the target file. The command line argument may include a malicious instruction, malicious content, a malicious payload, and/or a malicious application. In some embodiments, a malicious instruction may include a malicious logic sequence inserted into files of the computing device. For example, the malicious instruction may be inserted into a file and subsequently be replicated to infect other files on the computing device. Similarly, malicious content may include malicious code that poses a number of risks to the computing device (e.g., retrieves and/or installs malware, changes system configurations, damages data, sends email without the knowledge and/or consent of the user, etc.). The malicious payload may include a number of instructions delivered via an exploit (e.g., of the target file and/or an application configured to open the target file), and may perform a malicious action on the computing device (e.g., gain root access to the computing device, delete system files, etc.). The malicious application may be installed on the computing device based on malicious instructions included in the command line argument (e.g., an application may be automatically installed that infects the computing device with malware). Attackers may find the command line argument an effective vessel for carrying out malicious instructions, payloads, and/or applications.

Attribute-identification module 114 may analyze the shortcut file to identify a file extension of the shortcut file. In particular, attribute-identification module 114 may parse the shortcut file to identify the attribute that identifies the file extension of the shortcut file. In some examples, as in a MICROSOFT WINDOWS environment, the file extension of the shortcut file may indicate a LNK file. In other examples, the file extension of the shortcut file may include a URL extension if the shortcut file refers to a remotely-stored file (e.g., a web page). Additionally, attribute-identification module 114 may identify the file name of the shortcut file, as it appears in the email, based on the attributes of the shortcut file.

In some examples, attribute-identification module 114 may analyze the shortcut file to identify a computer icon associated with the shortcut file. For example, attribute-identification module 114 may parse the shortcut file to identify a name and/or location of a computer icon used to represent the shortcut file within an operating environment. In some examples, the computer icon may appear on the screen adjacent to the file name of the attachment in the email, and suggest to the user (e.g., accurately or inaccurately) the file type and/or computer application associated with the shortcut file. In some examples, the computer icon may be associated with a specific computer application, such as MICROSOFT WORD, MICROSOFT EXCEL, ADOBE ACROBAT, WINDOWS MEDIA PLAYER, etc. Additionally or alternatively, the computer icon may be associated with a specific file type, such as an image file, an audio file, a video file, an executable file, a text file, etc.

In some examples, attribute-identification module 114 may analyze the shortcut file to identify a location of the target file. For example, attribute-identification module 114 may parse the shortcut file to identify the location of the target file. In some embodiments, the target file may be located on a mail server or any other suitable server for storing the target file associated with the attachment. For example, the attribute of the shortcut file may include a location that indicates that the target file is stored on an email server. Additionally or alternatively, the attribute of the shortcut file may indicate that the target file is located at a remote network location (e.g., a remote network drive) or on a removable storage device (e.g., a USB drive). In some cases, an attacker may find it more convenient to store a malicious target file at a remote location, as detection of the malicious target file may be more difficult. Furthermore, the attacker may have greater access and control of a malicious target file that is located at a remote location. Thus, the location of the target file may serve as an important attribute of the shortcut file in determining whether the attachment is malicious.

FIG. 4 illustrates exemplary data 400 useful for determining whether a shortcut file is malicious. Using FIG. 4 as an example, at step 304 attribute-identification module 114 may analyze the shortcut file to identify attributes 402 of the shortcut file. Attributes 402 may include information identifying target file 410, information identifying at least one command line argument 420 applying to target file 410, information identifying a file extension 430 of the shortcut file, information identifying a computer icon 440 associated with the shortcut file, and/or information identifying a location 450 of target file 410. For example, exemplary system 400 may include attributes 402 that identify target file 410 as a computer program. Therefore, file type 412 of target file 410 may be an executable file. Exemplary system 400 may also include attributes 402 that identify command line argument 420, where one type of command line argument 420 includes a malicious instruction 422. As a non-limiting example, opening a shortcut file may enable a malicious instruction 422 to access a file on the computing device and gather personal information. Exemplary system 400 may also include attributes 402 that identify a file extension 430 of the shortcut file. For example, file extension 420 of the shortcut file may include a LNK file extension. Exemplary system 400 may also include attributes 402 that identify a computer icon 440 associated with the shortcut file. For example, computer icon 440 may be represented by a PDF icon. Thus, the PDF icon may imply that the file type 442 of the shortcut file may be a PDF file. Exemplary system 400 may also include attributes 402 that identify a location 450 of the target file. For example, location 450 of the target file may be a remote network location 452, where the target file (e.g., files, computer programs, etc.) may be located on a remote computing device.

Returning FIG. 3, at step 306 one or more of the systems described herein may identify accompanying text in the email that characterizes the attachment. For example, at step 306 text-identification module 116 may, as part of computing device 202 in FIG. 2, identify accompanying text 214 in email 210 that characterizes attachment 212.

As used herein, the phrase "accompanying text" may include any text included in the email (e.g., the body of the email, the subject line and/or title of the email, etc.). As mentioned above, the accompanying text may characterize the file type of the attachment. As a non-limiting example, the email may contain text that describes the attachment as a certain type of file (e.g., a word processing document, a presentation document, an audio file, a video file, etc.). Additionally or alternatively, the accompanying text may characterize the subject matter of the attachment. For example, the email may contain text that describes the attachment as an image file from a recent family vacation. Thus, not only may the text imply the file type of the attachment (e.g., a photograph), but the subject matter of the attachment as well (e.g., a family vacation photograph).

As previously stated, text-identification module 116 may identify the accompanying text in the email that characterizes the attachment. In particular, text-identification module 116 may identify the accompanying text by parsing the accompanying text to identify at least one key word that characterizes the attachment. In some embodiments, text-identification module 116 may analyze each word and/or phrase in the email by comparing each word and/or phrase in the email to a text database. Based on the definition (e.g., meaning and/or implications) of each word and/or phrase according to the text database, text-identification module 116 may determine the meaning of the key words found in the accompanying text. In general, the meaning of the key words found in the accompanying text may characterize the file type of the attachment.

As used herein, the phrase "text database" may refer to any database of words and/or phrases that may characterize an attachment. As a non-limiting example, text-identification module 116 may analyze text that includes a number of words and/or phrases. Based on associations between the words and/or phrases according to the text database and expected file attachment features, text-identification module 116 may identify the key words found in the accompanying text that may characterize the attachment. Based on the key words, text-identification module 116 may determine the expected file type of the attachment.

FIG. 5 illustrates an exemplary system 500 for detecting malicious email attachments. Using FIG. 5 as an example, at step 306 text-identification module 116 may identify accompanying text in the email that characterizes the attachment. In some embodiments, exemplary system 500 may include text-identification module 116 that compares the accompanying text with text database 510. For example, the text may include the phrase "please see the attached document," and according to text database 510, text-identification module 116 may determine that the key words 520 found in the accompanying text are "attached" and "document." Based on key words 520, text-identification module 116 may determine that the expected file type 532 of the attachment is a document file (e.g., a word processing document).

Returning to FIG. 3, at step 308 one or more of the systems described herein may determine that the attachment is malicious by comparing the attribute of the shortcut file with the accompanying text in the email that characterizes the attachment and, based on the comparison, determine that the accompanying text does not accurately characterize the shortcut file. For example, at step 308 malicious-attachment-determination module 118 may, as part of computing device 202 in FIG. 2, determine that attachment 212 is malicious by comparing attribute 220 of shortcut file 216 with accompanying text 214 in email 210 that characterizes attachment 212 and, based on the comparison, determine that accompanying text 214 does not accurately characterize shortcut file 216.

Malicious-attachment-determination module 118 may compare any of a variety of attributes of the shortcut file with the accompanying text to determine that the attachment is malicious. For example, malicious-attachment-determination module 118 may determine that the attachment is malicious based on the accompanying text that characterizes the attachment as not being a shortcut file. In some examples, text-identification module 116 may identify the accompanying text that characterizes the attachment as not being a shortcut file. As a non-limiting example, the accompanying text may state "please find attached a PDF file," and therefore, the accompanying text may characterize the attachment as a PDF file rather than a shortcut file. In such a scenario, malicious-attachment-determination module 118 may determine that the attachment is indeed the shortcut file. In some examples, malicious-attachment-determination module 118 may determine that the attachment is a shortcut file based on the file extension of the shortcut file (e.g., LNK file). If malicious-attachment-determination module 118 determines that the accompanying text characterizes the attachment as not being a shortcut file when in fact the attachment is indeed the shortcut file, the attachment may be malicious.

As another example, malicious-attachment-determination module 118 may determine that the attachment is malicious based on the accompanying text not correctly characterizing the target file. For example, the accompanying text may indicate that the attachment is a PDF file but the target file may include an executable file (e.g., "cmd.exe").

In some embodiments, malicious-attachment determination module 118 may compare the target file with expected target file characteristics, and, if the target file does not include the expected target file characteristics, determine that the attachment may be malicious. For example, malicious-attachment-determination module 118 may compare the file type of the target file with the expected file type of the target file. As another example, malicious-attachment-determination module 118 may compare the file extension of the target file with the expected file extension of the target file. As previously discussed, the file type and/or the file extension of the target file may be determined based on the attributes of the shortcut file. Similarly, the expected file type and/or file extension may be determined based on the accompanying text in the email.

In some embodiments, malicious-attachment-determination module 118 may determine that the attachment is malicious based on the computer icon associated with the shortcut file. In particular, malicious-attachment-determination module 118 may determine the file type and/or computer application associated with the computer icon based on the attributes of the shortcut file determined by attribute-identification module 114. Subsequently, malicious-attachment-determination module 118 may compare the file type represented by the computer icon with the file type of the target file. In particular, the file type of the target file is determined by the attributes of the shortcut file. Malicious-attachment-determination module 118 may determine that the attachment is malicious if the file type represented by the computer icon does not match the file type of the target file.

In some embodiments, malicious-attachment determination module 118 may determine that the attachment is malicious by determining that the location of the target file corresponds to a remote network location (e.g., a remote server unconnected with the mail server) and/or a removable storage device (e.g., a USB drive). In particular, malicious-attachment-determination module 118 may analyze the attribute determined by attribute-identification module 114 that indicates the location of the target file. Depending on whether the attribute indicates that the location of the target file corresponds to a remote network location and/or removable storage device, malicious-attachment-determination module 118 may determine that the attachment may be malicious.

In some embodiments, malicious-attachment-determination module 118 may determine that the command line argument applying to the target file is malicious. Non-limiting examples of command line arguments that may be malicious include, but are not limited to, a malicious instruction, a malicious payload, a malicious application, and/or malicious content. Malicious-attachment-determination module 118 may determine the command line argument is malicious based on the attributes of the shortcut file that identify the command line argument. In some embodiments, malicious-attachment-determination module 118 may compare the command line argument with the accompanying text, and based on the comparison, determine that the accompanying text does not accurately characterize the shortcut file. For example, malicious-attachment-determination module 118 may determine that the command line argument found in the shortcut file is attempting to execute a computer application that retrieves a file via the Internet. However, if the accompanying text indicates that the attachment is a text document, malicious-attachment-determination module 118 may determine that the accompanying text does not accurately characterize the shortcut file.

FIG. 5 illustrates an exemplary system for detecting malicious email attachments. Using FIG. 5 as an example, at step 308 malicious-attachment-determination module 118 may compare file type of target file 530 and expected file type 532. As a non-limiting example, file type of target file 530 may include an executable file type and expected file type 532 may include an image file type. For example, file type of target file 530 (e.g., executable file) may be determined based on the attributes of the shortcut file, and expected file type 532 (e.g., image file) may be determined based on the accompanying text. In this example, malicious-attachment-determination module 118 may determine that file type of target file 530 is not the same as expected file type 532, and therefore, that the attachment may be malicious.

In some examples, malicious-attachment-determination module 118 may perform a security action responsive to determining that the attachment is malicious. In some examples, malicious-attachment-determination module 118 may display a warning message indicating that the attachment is malicious. The warning message may describe an anticipated effect of opening the attachment. The warning message may give the email recipient an option to ignore the warning message and open the attachment in spite of the warning message. In some embodiments, malicious-attachment-determination module 118 may block an attempt to open the attachment. Additionally or alternatively, malicious-attachment-determination module 118 may quarantine the attachment and/or remove the attachment, where the attachment may be removed automatically or through instructions from the email recipient. In some examples, malicious-attachment-determination module 118 may submit the email and/or the attachment to a spam filter and/or a malware database.

As explained above, by analyzing accompanying text in emails that characterizes shortcut file attachments, the systems and methods described herein may more effectively determine whether shortcut file attachments are malicious. For example, these systems and methods may determine that the text in an email mischaracterizes the nature of the shortcut file attachment and/or a file referenced by the shortcut file attachment, thereby determining that the attachment is untrustworthy. Furthermore, by analyzing the attributes of shortcut files, these systems and methods may determine whether opening the shortcut file results in opening an anticipated type of file. By identifying accompanying text in the email that characterizes the attachment, as well as identifying attributes of the shortcut file, the systems and methods described herein may utilize additional information useful for determining whether shortcut file attachments are trustworthy.

Figure 6:
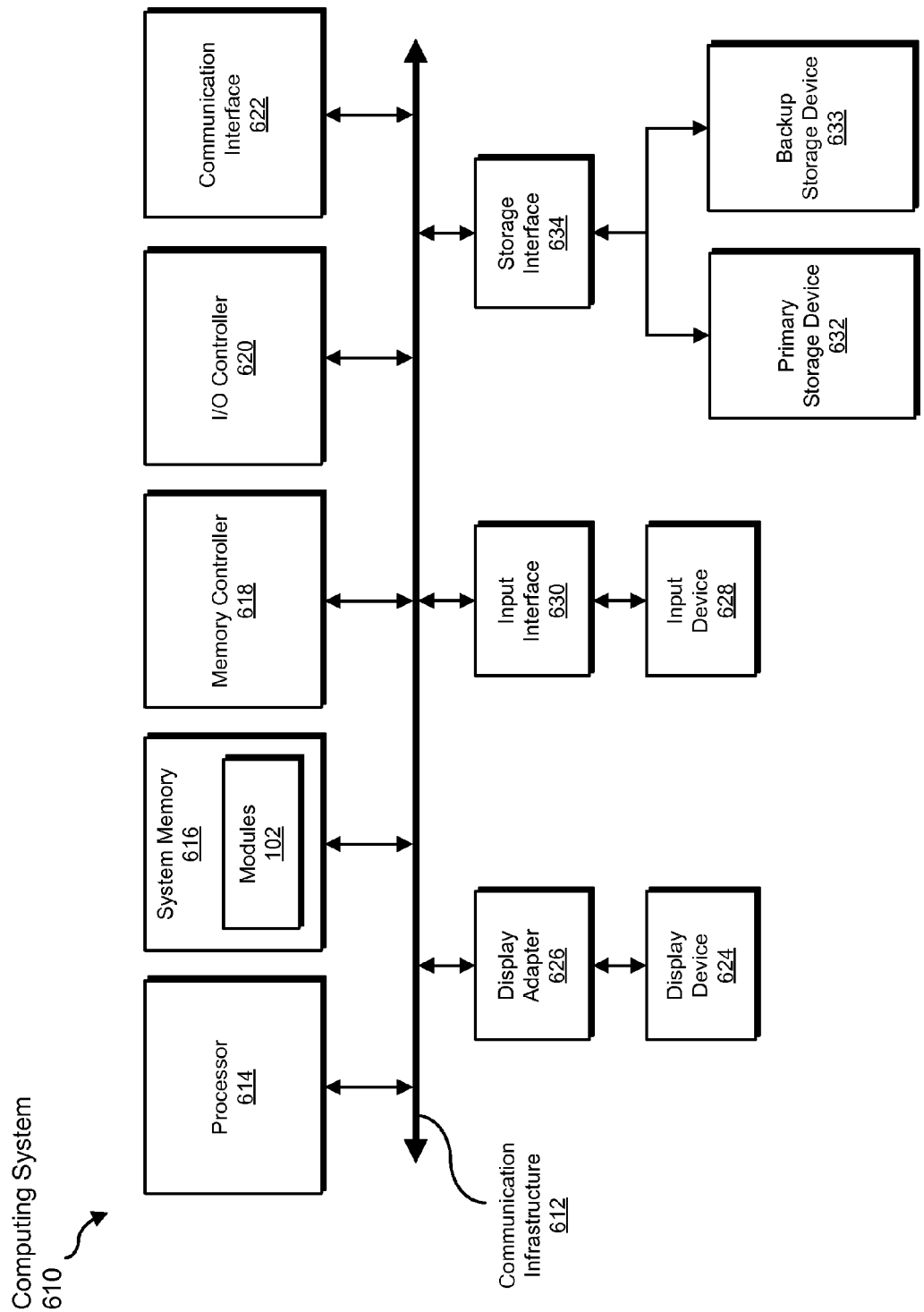
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, analyzing, determining, comparing, parsing, performing, displaying, describing, blocking, quarantining, and removing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
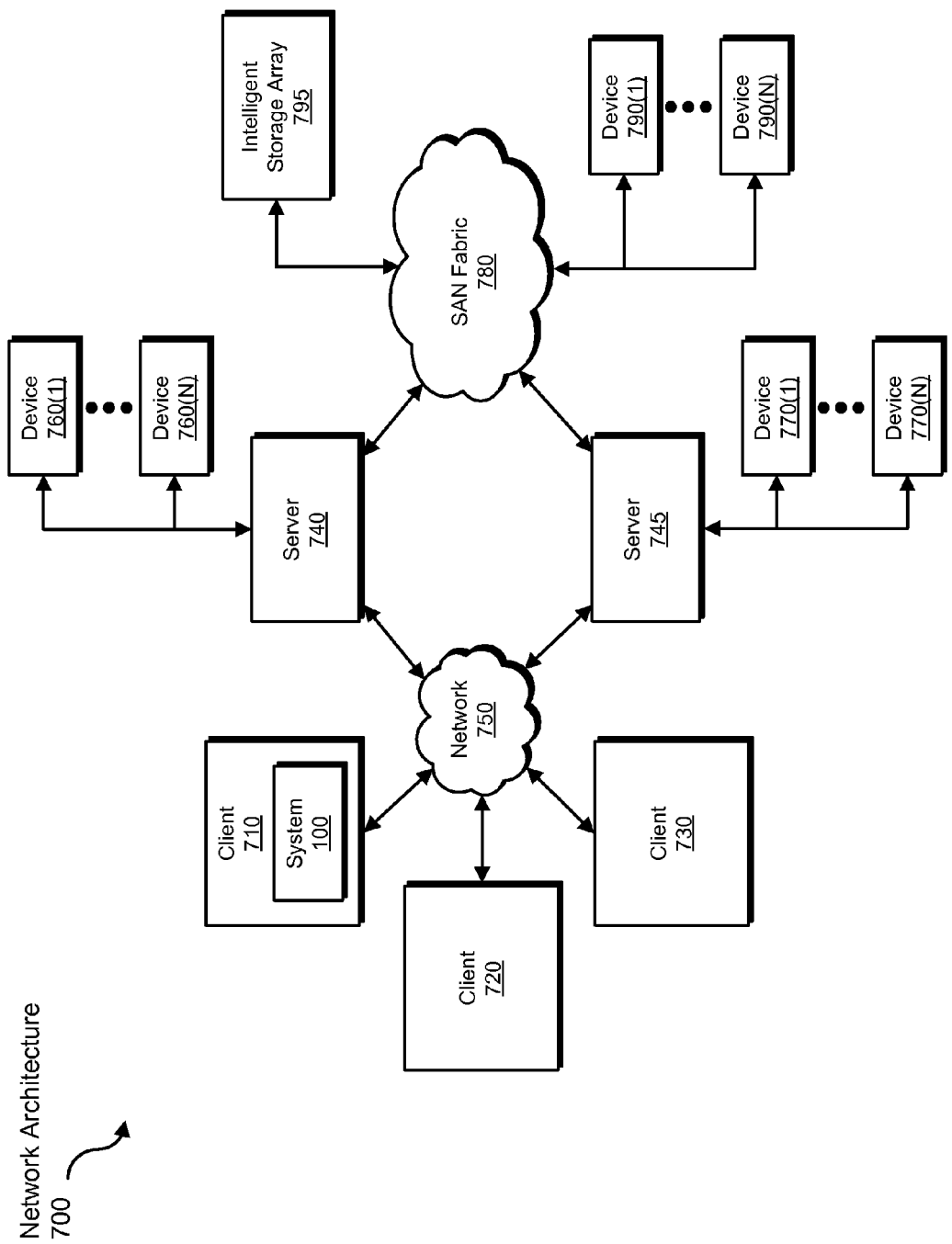
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting malicious email attachments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for detecting malicious email attachments.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malicious email attachments, at least a portion of the method being performed by a computing device comprising at least one processor, the method comprising:
    identifying a shortcut file received as an attachment to an email, wherein the shortcut file is configured to open a target file;
    analyzing the shortcut file by parsing one or more sections of the shortcut file to identify a command line argument that applies to the target file, wherein the command line argument comprises information about the target file useful for determining whether text accurately characterizes the shortcut file;
    identifying accompanying text in the email that characterizes the attachment;
    determining that the attachment is malicious by:
        comparing the command line argument that applies to the target file with the accompanying text in the email that characterizes the attachment;
        based on the comparison, determining that the accompanying text does not accurately characterize the shortcut file.

2. The method of claim 1, wherein:
    the shortcut file comprises a LNK file;
    identifying the command line argument comprises identifying the command line argument from a STRING DATA section of the LNK file.

3. The method of claim 2, further comprising determining, based on the comparison, that the command line argument applying to the target file is malicious, wherein the command line argument comprises at least one of:
    a malicious instruction;
    malicious content;
    a malicious payload;
    a malicious application.

4. The method of claim 3, wherein the malicious payload comprises malicious instructions delivered via the target file and/or an application configured to open the target file.

5. The method of claim 1, wherein:
    identifying the command line argument comprises determining that the command line argument is attempting to execute a computer application that retrieves a file via the Internet;
    identifying the accompanying text in the email comprises determining that the accompanying text indicates that the shortcut file is a text document;
    determining that the accompanying text does not accurately characterize the shortcut file comprises determining that the accompanying text indicates that the shortcut file is a text document.

6. The method of claim 1, further comprising performing a security action responsive to determining that the attachment is malicious, wherein the security action comprises at least one of:
    displaying a warning message indicating that the attachment is malicious;
    describing an anticipated effect of opening the attachment;
    blocking an attempt to open the attachment;
    quarantining the attachment;
    removing the attachment.

7. The method of claim 1, wherein:
    the target file and the shortcut file are separate files;
    selecting the shortcut file produces the same result as selecting the target file.

8. The method of claim 1, wherein the shortcut file comprises at least one of a LNK file extension or a URL file extension.

9. The method of claim 1, wherein identifying the accompanying text in the email comprises parsing the accompanying text to identify at least one key word that characterizes the attachment.

10. The method claim 1, wherein identifying the accompanying text in the email comprises:
    comparing at least one word and/or phrase in the email to a text database;
    determining a meaning of the word and/or phrase based on a definition according to the text database.

11. A system for detecting malicious email attachments, the system comprising:
    a shortcut-identification module programmed to identify a shortcut file received as an attachment to an email, wherein the shortcut file is configured to open a target file;
    an attribute-identification module programmed to analyze the shortcut file by parsing one or more sections of the shortcut file to identify a command line argument that applies to the target file, wherein the command line argument comprises information about the target file useful to determine whether text accurately characterizes the shortcut file;
    a text-identification module programmed to identify accompanying text in the email that characterizes the attachment;
    a malicious-attachment-determination module programmed to determine that the attachment is malicious by:

comparing the command line argument that applies to the target file with the accompanying text in the email that characterizes the attachment;

based on the comparison, determining that the accompanying text does not accurately characterize the shortcut file;

at least one hardware processor configured to execute the shortcut-identification module, the attribute-identification module, the text-identification module, and the malicious-attachment-determination module.

12. The system of claim 11, wherein:

the shortcut file comprises a LNK file;

the attribute-identification module is programmed to identify the command line argument by identifying the command line argument from a STRING DATA section of the LNK file.

13. The system of claim 12, wherein the malicious-attachment-determination module is further programmed to determine, based on the comparison, that the command line argument applying to the target file is malicious, wherein the command line argument comprises at least one of:

a malicious instruction;

malicious content;

a malicious payload;

a malicious application.

14. The system of claim 13, wherein the malicious payload comprises malicious instructions delivered via the target file and/or an application configured to open the target file.

15. The system of claim 11, wherein:

the attribute-identification module is further programmed to determine that the command line argument is attempting to execute a computer application that retrieves a file via the Internet;

the text-identification module is further programmed to determine that the accompanying text indicates that the shortcut file is a text document;

the malicious-attachment-determination module is programmed to determine that the accompanying text does not accurately characterize the shortcut file based on the determination that the accompanying text indicates that the shortcut file is a text document.

16. The system of claim 11, wherein the malicious-attachment-determination module is further configured to perform a security action responsive to determining that the attachment is malicious, wherein the security action comprises at least one of:

displaying a warning message indicating that the attachment is malicious;

describing an anticipated effect of opening the attachment;

blocking an attempt to open the attachment;

quarantining the attachment;

removing the attachment.

17. The system of claim 11, wherein:

the target file and the shortcut file are separate files;

selecting the shortcut file produces the same result as selecting the target file.

18. The system of claim 11, wherein the shortcut file comprises at least one of a LNK file extension or a URL file extension.

19. A non-transitory computer-readable-storage medium comprising one or more computer-executable instructions that, when executed by at least one processor of a computing device, cause the computing device to:

identify a shortcut file received as an attachment to an email, wherein the shortcut file is configured to open a target file;

analyze the shortcut file by parsing one or more sections of the shortcut file to identify a command line argument that applies to the target file, wherein the command line argument comprises information about the target file useful to determine whether text accurately characterizes the shortcut file;

identify accompanying text in the email that characterizes the attachment;

determine that the attachment is malicious by comparing the command line argument that applies to the target file with the accompanying text in the email that characterizes the attachment and, based on the comparison, determining that the accompanying text does not accurately characterize the shortcut file.

20. The non-transitory computer-readable-storage medium of claim 19, wherein the shortcut file comprises at least one of a LNK file extension or a URL file extension.

* * * * *

UNITED STATES PATENT AND TRADEMARK OFFICE
CERTIFICATE OF CORRECTION

| | | |
|---|---|---|
| PATENT NO. | : 9,246,933 B1 | |
| APPLICATION NO. | : 13/557679 | |
| DATED | : January 26, 2016 | |
| INVENTOR(S) | : Bhaskar Krishnappa | |

It is certified that error appears in the above-identified patent and that said Letters Patent is hereby corrected as shown below:

Claims

Claim 2, at column 17, lines 63 to 65, should read:

identifying the command line argument comprises identifying the command line argument from a STRING_DATA section of the LNK file.

Claim 12, at column 19, lines 13 to 16, should read:

the attribute-identification module is programmed to identify the command line argument by identifying the command line argument from a STRING_DATA section of the LNK file.

Signed and Sealed this
Twenty-fourth Day of May, 2016

Michelle K. Lee
*Director of the United States Patent and Trademark Office*